United States Patent [19]

Bentley et al.

[11] 4,392,049
[45] Jul. 5, 1983

[54] CONDENSATION HEATING APPARATUS AND METHOD

[75] Inventors: Peter D. Bentley, Brighton; James F. Pollock, Hook, both of England

[73] Assignee: United Kingdom Atomic Energy Authority, London, England

[21] Appl. No.: 286,382

[22] Filed: Jul. 20, 1981

Related U.S. Application Data

[62] Division of Ser. No. 150,429, May 16, 1980, Pat. No. 4,327,271.

[30] Foreign Application Priority Data

May 18, 1979 [GB] United Kingdom ............... 7917469
May 9, 1980 [GB] United Kingdom ............... 8015528

[51] Int. Cl.³ .............................................. F27D 11/00
[52] U.S. Cl. ................................ 219/401; 165/104.25;
219/85 E; 219/381; 228/180 R; 126/369
[58] Field of Search ............... 219/85 E, 326, 380, 219/362, 381, 382, 401, 431, 440; 165/104.25, 105; 432/197; 426/506; 228/180 R, 249; 126/369; 21/56

[56] References Cited

U.S. PATENT DOCUMENTS

| | | | |
|---|---|---|---|
| 3,320,945 | 5/1967 | Dunkelman | 126/369 |
| 3,450,487 | 6/1969 | Wallden | 21/56 |
| 3,879,599 | 4/1975 | Kodaira | 219/326 |
| 3,943,330 | 3/1976 | Pollock et al. | 219/381 |
| 4,055,217 | 10/1977 | Chu et al. | 228/180 R X |
| 4,077,467 | 3/1978 | Spigarelli | 165/105 |
| 4,090,843 | 5/1978 | Chu et al. | 432/197 |
| 4,140,266 | 2/1979 | Wagner | 219/85 E X |
| 4,257,157 | 3/1981 | Pollock et al. | 219/381 X |

Primary Examiner—Volodymyr Y. Mayewsky
Attorney, Agent, or Firm—William R. Hinds

[57] ABSTRACT

An apparatus or a method for heating a component by the condensation thereon of a suitable vapor, for example to make a soldered connection in condensation soldering. The vapor is produced by passing a heat transfer oil through a vaporizer comprising permeable electrically conductive material, and is introduced into a heating chamber containing the component. The heating chamber is held at a pressure below atmospheric pressure, and a condenser chamber is connectable to the heating chamber for condensing the vapor at the end of the heating cycle.

8 Claims, 3 Drawing Figures

CONDENSATION HEATING APPARATUS AND METHOD

This is a division, of application Ser. No. 150,429 filed May 16, 1980, now U.S. Pat. no. 4,327,271, issued Apr. 27, 1982.

FIELD AND BACKGROUND OF THE INVENTION

This invention relates to an apparatus and to a method for transferring heat to an article by condensation thereon of a vapour, and more particularly but not exclusively to an apparatus and to a method for condensation soldering. Condensation soldering has been described in (1) "Condensation Soldering" by R. C. Pfahl Jr., J. C. Mollendorf, and T. Y. Chu, published in Welding Journal, Jan. 1975;
(2) U.S. Pat. No. 3,866,307, and
(3) Western Electric Engineer April 1975, article by T. Y. Chu et al, reference being directed to these publications which are incorporated by reference herein.

The heating of an article by condensation heat transfer requires the immersion of the article in the saturated vapour of a working liquid. If the temperature of the article is initially below the temperature of the saturated vapour, condensation takes place on the article with the consequent transfer to it of the latent heat of the vapour. Thus in condensation soldering hot vapour of a suitable liquid is used to transfer heat quickly, by use of the latent heat of condensation thereof, to a solder preform to melt the solder so that it flows under surface tension effects to make a soldered connection. The condensate of the vapour selected is immiscible with the molten solder so that condensation soldering provides a clean environment in which the soldering can take place.

FEATURES AND ASPECTS OF THE INVENTION

According to one aspect, the invention provides an apparatus for heating an article by condensation thereon of a vapour, the apparatus comprising a closable chamber for containing the article, a vapour source connectable to the chamber and comprising a permeable electrically conducting matrix, and means for introducing a liquid to be vaporized through the matrix so as to produce from the effect of joule heating of the matrix a vapour for heating the article.

The apparatus may include vacuum means for reducing the pressure inside the chamber substantially below atmospheric pressure, or a portion of the chamber may be expansible and contractable in response to changes in pressure inside the chamber so as to maintain said pressure substantially at atmospheric pressure.

In another aspect, the invention includes a method of heating an article by the condensation thereon of a vapour, the method comprising, placing an article to be heated in a closable chamber, closing the chamber, passing a liquid through a permeable electrically conducting matrix so as to produce vapour from at least a portion of the liquid, and introducing the vapour into the chamber so as to heat the article by the condensation thereon of the vapour.

The method may include reducing the pressure of the environment inside the chamber substantially below atmospheric pressure before the vapour is introduced into the chamber, or may include maintaining said environment substantially at atmospheric pressure.

The invention has one application in condensation soldering and in a further aspect includes a component having soldered joints made by the method of the invention.

The permeable electrically conducting matrix of the above aspects of the invention is desirably provided by a vaporizer comprising a hollow cylindrical body of permeable electroconductive material extending between two electrical terminals across which terminals a suitable voltage can be established. Examples of such vaporizers are described in British Patent Specification Nos. 1395494 and 1466240, and the Specification of co-pending British Patent Application No. 21702/77 (German Offenlegungsschrift No. 2822536.7, U.S. Ser. No. 908681, now U.S. Pat. No. 4,257,157), reference being directed to these specifications which are incorporated by reference herein.

DESCRIPTION OF THE DRAWINGS

The invention will now be further described by way of example only with reference to the accompanying drawings in which.

DESCRIPTION OF PREFERRED EMBODIMENTS

Figure 1:
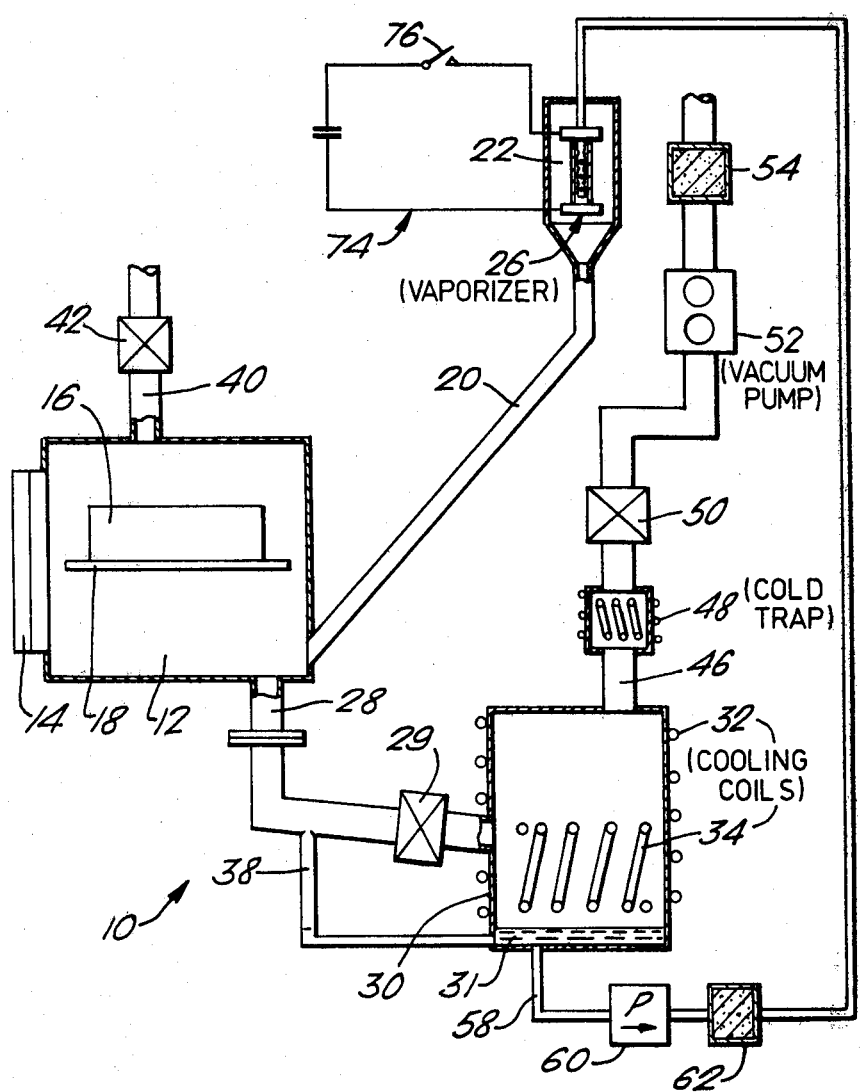
FIG. 1 shows a side diagrammatic representation of a condensation soldering apparatus.

Referring now to FIG. 1, a condensation soldering apparatus 10 is shown and comprises a chamber 12 having a vacuum and pressure tight door 14 through which a workpiece or component 16 (e.g. a circuit board) to be soldered and having solder preforms (not shown) thereon can be introduced into the chamber 12 to rest on a support 18. An upwardly extending duct 20 near the bottom and at one side of the chamber 12 connects with a vaporizing chamber 22 in which a vaporizer 26 similar to those described in the afore-mentioned specifications is disposed. A duct 28 from the base of the chamber 12 connects through a valve 29 with a condenser chamber 30 containing a fluorocarbon liquid (Fomblin) 31. The condenser chamber 30 is surrounded by cooling coils 32 and has cooling coils 34 therein for the circulation of a cooling medium (e.g. water), and a branch pipe 38 extends from the underside of the duct 28 to the base of the condenser chamber 30. A vent duct 40 having a valve 42 extends from the top of the chamber 12, and a duct 46 extending upwardly from the top of the condenser chamber 30 connects through a cold trap 48 and a valve 50 to a rotary vacuum pump 52 which discharges through a mist eliminator 54.

Figure 1A:
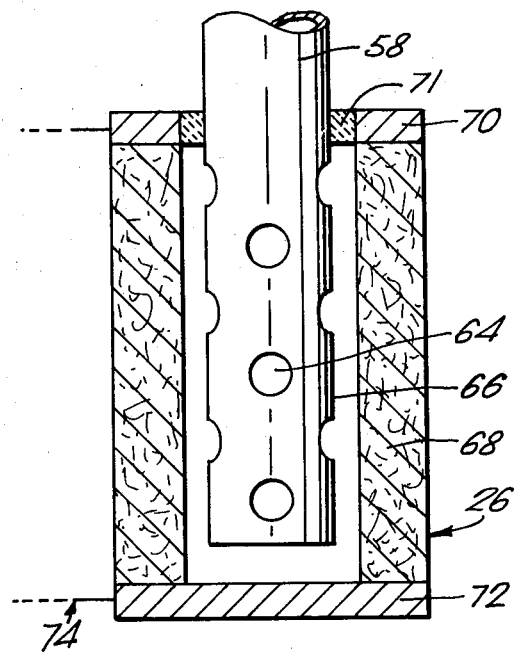
FIG. 1a shows to an elarged scale and in median section, a diagrammatic representation of a vaporizer used in the apparatus of FIG. 1.

A drain duct 58 from the base of the condenser chamber 30 connects through a pump 60 and a filter 62 to the vaporizing chamber 22. As shown in FIG. 1a, the drain duct 58 has perforations 64 in an end 66 extending along the inside of the vaporizer 26 which basically includes a hollow cylindrical heater element 68 of permeable electroconducting material (e.g. carbon) extending between two electrical terminals 70, 72, terminal 70 being electrically insulated from the drain duct 58 by an insulating bush 71. By means which are shown simplistically, an electric circuit 74 having a switch 76 is connected across the terminals 70, 72 to cause electric heating current (e.g. 200 amps at 20 volts) to flow through the heater element 68 when the switch 76 is closed.

In operation, the valve 42 is closed and the valves 29, 50 open, with the door 14 tightly closed. Air is removed from the chamber 12 by the vacuum pump 52 until the chamber 12 is at a vacuum pressure of between 1 and 750 Torr. The valves 50 and 29 are then closed and the vacuum pump 52 switched off. The pump 60 is started to circulate the liquid 31 in the condenser chamber 30 through the vaporizer 26 from which the liquid 31 returns to the condenser chamber 30 through the ducts 20 and 28, the switch 76 then being switched on to energize the vaporizer 26 so that the liquid 31 is vaporized by the joule heating of the heater element 68. The saturated or superheated vapour of the liquid 31 passes through the duct 20 into the chamber 12 where the vapour commences to condense on the walls of the chamber 12, on the component 16, and on the solder preforms. Vapour generation is continued until the solder preforms melt and flow on the component 16 to make the soldered joints. The switch 76 is then opened and the pump 60 stopped. Valve 29 is opened so that the vapour condenses on the walls of the condenser chamber 30 and on the cooling coils 34. Any uncondensed vapour is finally removed by opening valve 50 and operating the vacuum pump 52, most of the vapour condensing in the condenser chamber 30 and in the cold trap 48 from which it runs back into the condenser chamber 30. Valves 29 and 50 are then closed and valve 42 opened to admit air into the chamber 12 to enable the door 14 to be opened and the component 16 to be removed.

As the chamber 12 is evacuated before the vapour is introduced into it, and again before the component 16 is removed from the chamber 12, problems associated with the partial pressure exerted by any residual air, or by drag-out of any toxic vapour with removal of the component 16, are overcome to a large extent. Thus any air/vapour interface in the chamber 12 should be well above the component 16. Although the use of a fluorocarbon has been described and which has a much heavier molecular weight than that of air, vapours of a much lower molecular weight may be used. Certain liquids (e.g. FOMBLIN) used in the condensation soldering process exhibit the property of a significantly large reduction of saturation temperature as pressure is reduced. Consequently it is not only possible to carry out a condensation soldering process using the method of the invention at the unique liquid condensation temperature associated with atmospheric pressure but also by controlling the pressure to select a desired condensation temperature. Various liquids which are suitable for use in the method of the invention include a polyoxypropylene with a molecular weight of 950.16 and a boiling point of 223.9° C. at atmospheric pressure, a perfluoropolyether which is sold under the registered trade mark FOMBLIN, a fluorocarbon sold under the registered trade mark FLUORINERT, and a silicone vacuum pump oil.

As the vaporizer 26 can be brought to its operating temperature within a few seconds of start up, and excess uncondensed vapour is removed speedily by the vacuum pump 52, relatively rapid heating cycles can be employed. Heater elements 68 may be employed at relatively high power density ratings (e.g. 1000 watt/cm$^3$ of element material) which permits the use of very compact heater elements 68 of great flexibility in operation. Suitable heater elements may be obtained from: Porous Element Heating Ltd., Havenside, Boston, Lincolnshire, England.

Figure 2:
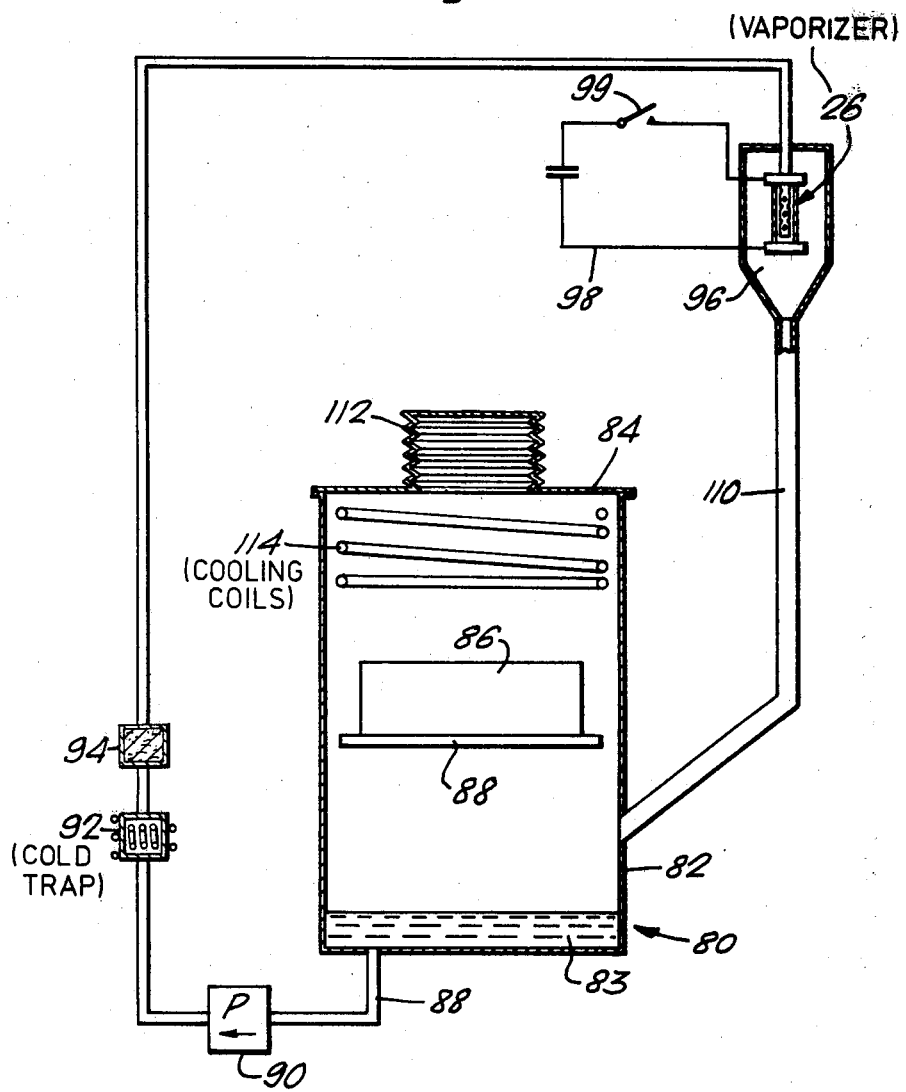
FIG. 2 shows a side diagrammatic representation of an alternative condensation soldering apparatus.

Although the invention has been described in relation to an apparatus having provision for reducing the pressure of the environment within the heating chamber, the invention may also be used in conjunction with a heating chamber arranged to hold the pressure therein substantially at atmospheric pressure as shown in FIG. 2 to which reference is now made. In FIG. 2, an apparatus 80 is shown comprising a chamber 82 containing one of the above-mentioned liquids 83 which has a molecular weight heavier than that of air, and having a removable cover 84 to enable a workpiece or component (e.g. a circuit board) having solder preforms (not shown) thereon to be placed on a support 88 in the chamber 82. A duct 88 extends downwardly from the chamber 82 to a pump 90 and leads through a cold trap 92, and a filter 94, to a vaporizer 26 identical to the vaporizer 26 of FIG. 1 and positioned above the chamber 82. The vaporizer 26 is held in a vaporizing chamber 96 and is arranged to be energised by an electric circuit 98 having a switch 99 and identical to the electric circuit 74 of FIG. 1. The vaporizing chamber 96 is connected by a downwardly extending duct 110 to the lower side of the chamber 80. The cover 82 has an upstanding bellows 112, and cooling coils 114 are positioned inside and on the top of the chamber 82.

In operation, the component 86 with the solder preforms thereon is placed on the support 88 and the cover 84 replaced. The pump 90 is started up to circulate the liquid 83 through the vaporizer 26, the switch 99 then being switched on to energise the vaporizer 26 and vaporize the liquid 83 from the joule heating of the vaporizer 26. The saturated or superheated vapour of the liquid 83 passes down the duct 110 into the chamber 82 and displaces air in the chamber 82, there being a distinct air/vapour interface above the component 86 but preferably below the cooling coils 114. The vapour condenses on the walls of the chamber 82, on the component 86, and on the solder preforms which melt and flow on the component 86 in a similar manner to that described in relation to operation of the apparatus of FIG. 1. The pump 90 is then stopped and the switch 99 opened, and after a period to allow the liquid to drain off the component 86, the cover 84 is removed to allow the component 86 to be withdrawn from the chamber 82.

The bellows 112 from expansion and contraction thereof maintains the pressure within the chamber 82 substantially at atmospheric pressure, and thus minimises the effect of the partial pressure exerted by the air in the chamber 82. Although the apparatus of FIG. 2 possesses the advantages of rapid start-up and shutdown of the apparatus of FIG. 1, the problem of vapour loss or drag-out when the cover 84 and the component 86 are removed still remains.

In the apparatus of FIG. 1 it is possible to use a liquid which is otherwise suitable for condensation heating, irrespective of its molecular weight, for example the silicone oils provided that the latent heat of condensation and other properties are acceptable. This not only can allow the cost of the initial charge of the liquid to be reduced but enables the health hazards associated with the use of some liquids to be alleviated.

Although the invention has been described in relation to condensation soldering, it will be understood that the invention may be used in other processes where a component is to be heated by the latent heat of condensation of a vapour.

It is an advantage in use of the above apparatus for some of the liquid to remain unvaporized to ensure that the temperature of the vapour generated is substantially constant over the heater element outer surface and approximately at the saturation temperature of the liquid at the operating pressure.

When fluorocarbonpolyether liquids are heated to about 300°–350° C. they decompose thermally, but the decomposition products are all volatile. The lowest temperature at which these liquids decompose is normally above that needed for evaporation, so that under normal use of the vaporizer 26, the liquids would not have their chemical composition altered. However, it could happen that, due to the occurrence of local 'hotspots' or other fault conditions, some or all of the liquid could have its temperature raised to such a value that it starts to decompose. However, because the decomposition products arc volatile, they tend to be ejected from within the interior of the vaporizer 26 and pass out with the vaporized liquid, so that the permeability of the material of the vaporizer 26 is substantially unchanged.

An additional advantage of the apparatus of FIG. 1, is that the vapor pressure can be allowed to rise above atmospheric pressure if desired.

We claim:

1. A method of heating an article by the condensation thereon of a vapour, the method comprising,
   (a) placing an article to be heated in a heating chamber;
   (b) closing the heating chamber;
   (c) reducing the pressure inside the heating chamber;
   (d) passing a liquid through a permeable electrically conducting heating matrix outside the heating chamber so as to produce a vapour from the liquid;
   (e) introducing the vapour into the heating chamber so as to heat the article by the condensation thereon of the vapour, and
   (f) removing the vapour from the heating chamber after the article has been heated.

2. A method as claimed in claim 1, wherein the pressure inside the heating chamber is reduced to between 1 and 750 Torr.

3. A method as claimed in claim 2, wherein the reduced pressure is selected to produce a desired saturation temperature of the liquid.

4. A method as claimed in claim 1, or claim 2 or 3, including cooling the vapour removed from the heating chamber so as to condense said vapour.

5. Apparatus for heating an article by condensation thereon of a vapour, the apparatus comprising,
   (a) a heating chamber;
   (b) a removable closure portion of the heating chamber to enable an article to be inserted into and withdrawn from the heating chamber;
   (c) a permeable electrically conducting heating matrix outside the heating chamber for heating a liquid arranged to flow through the matrix to cause vaporization thereof;
   (d) a vaporizing chamber in which the heating matrix is located;
   (e) a first duct sealingly connected to the vaporizing chamber at one side of the heating matrix and to the heating chamber, so as to introduce vapour from the vaporization chamber into the heating chamber;
   (f) an electric circuit connectable to the heating matrix for energising the heating matrix;
   (g) a displacement pump for displacing the liquid through the matrix;
   (h) a second duct sealingly connected between the displacement pump and the vaporizing chamber at the other side of the heating matrix;
   (i) a drain means for the liquid from the heating chamber and connecting the heating chamber to the displacement pump;
   (j) cooling means for condensing vapour in the drain means; and
   (k) vacuum pump means connectable to the heating chamber for reducing the pressure inside the chamber below atmospheric pressure.

6. Apparatus as claimed in claim 5, wherein the cooling means comprises, a condenser chamber, and cooling coils in the condenser chamber for condensing the vapour, and the drain means includes, a drain duct sealingly connected to the heating chamber and to the condenser chamber, and a feed duct sealingly connected between the lower end of the condenser chamber and the displacement pump.

7. Apparatus as claimed in claim 6, wherein a branch duct of the drain duct is connected to the lower end of the condenser chamber, valve means are included in the drain duct in that portion thereof between the branch duct and the condenser chamber, and the vacuum pump means is connected to the condenser chamber, so as to reduce the pressure inside the heating chamber when the valve means is open.

8. Apparatus for condensation soldering and comprising,
   (i) a heating chamber;
   (ii) a door at the side of the heating chamber and closable in a vacuum tight manner;
   (iii) a support inside the heating chamber for an article to be soldered;
   (iv) a closable vent for the heating chamber;
   (v) a drain duct sealingly connected at one end to the bottom of the heating chamber;
   (vi) a condensing chamber at a lower level than that of the heating chamber and to which the other end of the drain duct is sealingly connected, the condensing chamber being adapted to contain a liquid;
   (vii) cooling coils inside and about the condensing chamber for the circulation of a cooling liquid;
   (viii) a displacement pump;
   (ix) a feed duct connected at one end to the bottom of the condensing chamber and at the other end thereof to the displacement pump for feeding the liquid in the condensing chamber to the displacement pump;
   (x) an electrically conducting heating matrix of hollow cylindrical form positioned above the heating chamber;
   (xi) a vaporizing chamber in which the heating matrix is located;
   (xii) an outlet duct connecting the displacement pump to the inside of the matrix so as to displace the liquid through the matrix;
   (xiii) an electric circuit connectable to the matrix so as to energise the matrix and vaporize the liquid in the matrix;
   (xiv) an inlet duct connecting the vaporizing chamber at the outside of the matrix to the heating chamber below the support so as to introduce vapour issuing from the matrix into the heating chamber;
   (xv) a vacuum pump means; and
   (xvi) a duct sealingly connecting the vacuum pump means to the upper portion of the condensing chamber so that operation of the vacuum pump means lowers the pressure inside the condensing chamber and thereby inside the heating chamber below atmospheric pressure.

* * * * *